Patented July 12, 1927.

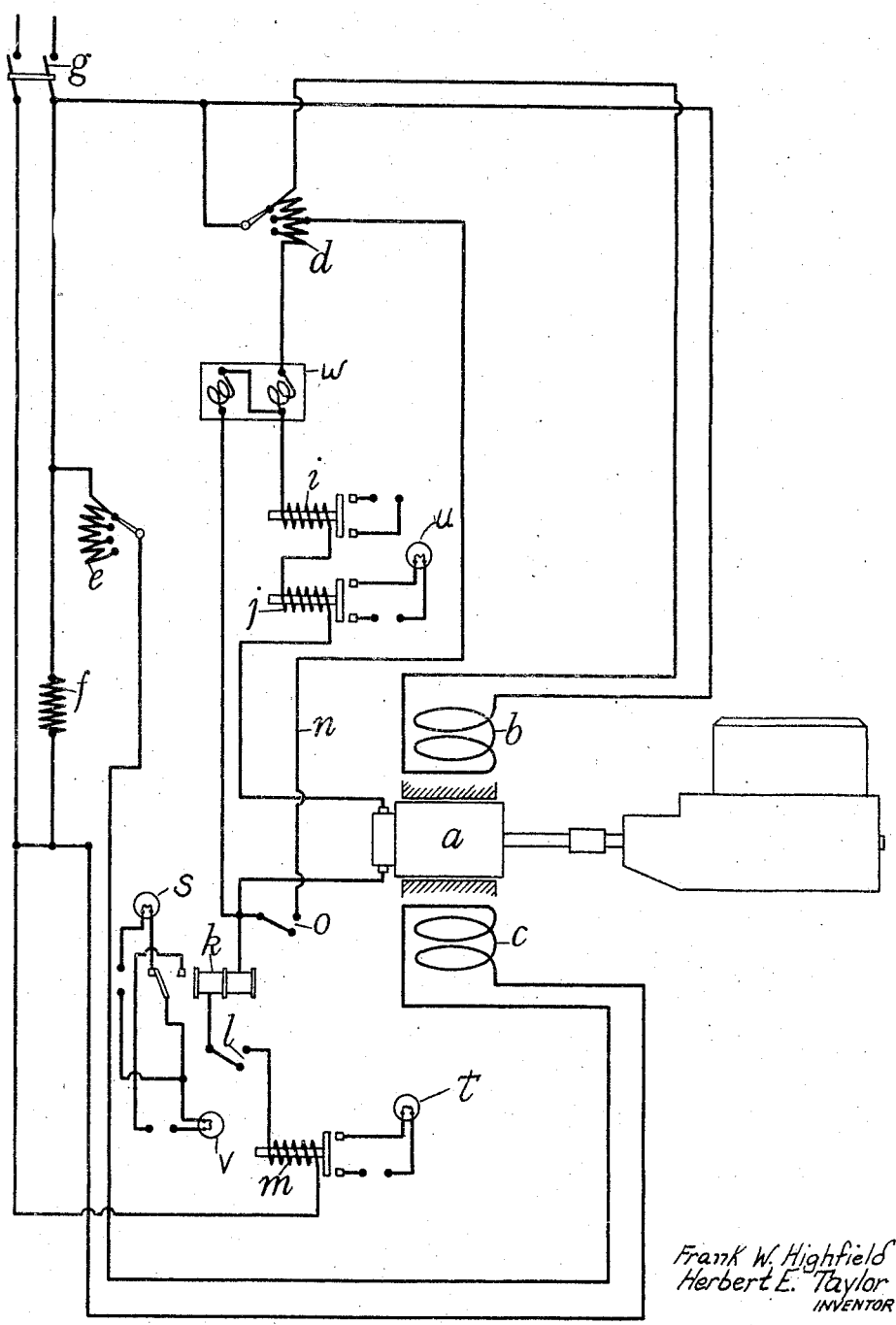

1,635,980

UNITED STATES PATENT OFFICE.

FRANK WILLIAM HIGHFIELD AND HERBERT EDGAR TAYLOR, OF COVENTRY, ENGLAND, ASSIGNORS TO THE HIGHFIELD ELECTRICAL COMPANY LIMITED, OF COVENTRY, ENGLAND.

ELECTRICAL TESTING APPARATUS FOR FLUID-PRESSURE ENGINES.

Application filed November 10, 1924, Serial No. 749,007, and in Great Britain December 8, 1923.

The invention relates to the conditioning (or running-in) and testing of fluid pressure engines and particularly internal combustion engines for mechanically propelled vehicles It is usual with a newly constructed engine to connect it to some source of motion and drive it for a time to overcome the initial stiffness. This operation is known as "conditioning" or "running-in."

The invention is adapted especially for use in factories where petrol engines for motor vehicles are manufactured in large quantities.

The object of the invention is to enable the conditioning and testing operations to be performed more expeditiously and advantageously than heretofore and without highly skilled supervision.

The invention comprises the employment of a dynamo-electric machine to which the engine is coupled, the said machine being capable of operating as a motor or generator, together with means whereby the conditioning (or running-in) operations can be carried out in two or more stages, and finally the engine can be run under its own power.

The invention also comprises the employment in the circuit of the dynamo-electric machine of indicating and controlling apparatus as hereinafter described.

The accompanying diagram illustrates one manner of carrying the invention into effect for the running-in and testing of petrol engines.

Referring to the diagram, $a$ is the dynamo-electric machine to which the engine is coupled. The machine is compound wound, the series winding being indicated by $b$ and the shunt winding by $c$. In conjunction with $b$ is a regulating resistance $d$, and in conjunction with $c$ is a regulating resistance $e$. The parts $c$ and $e$ may be combined with a shunt discharging circuit containing a suitable resistance $f$ for preventing excessive sparking when the supply circuit is broken. A main or isolating switch is employed and indicated by $g$.

In series with the machine are arranged a watt-meter $w$ of the dynamometer type with central zero, an overload relay $i$, a minimum current relay $j$, a differential relay $k$, a switch $l$, and a maximum power relay $m$. In conjunction with the system is also preferably arranged an additional or local circuit $n$ containing a switch $o$. This circuit is used when the engine is being adjusted to run under its own power.

Push buttons and contactors are preferably employed to bring the different parts of the system into operation, and in conjunction with the system are arranged suitably coloured lamps or other convenient indicating devices. An electrical or other speed indicator may be added.

Starting with an engine coupled to the dynamo-electric machine $a$, the attendant closes the switch $g$ and presses a button which causes the switch or contactor $l$ to be closed. The machine now functions as a motor, and the adjustments are such that the engine is driven at a slow speed. In this condition the greater part or all of the resistance $d$ would be in action. The power consumed is indicated by the watt-meter $w$, and the differential relay $k$ closes a circuit containing, for example, a red lamp $s$ or other indicating device showing that the machine $a$ is operating as a motor. If the current taken by the motor is excessive, owing to excessive resistance to rotation in the engine, the overload relay $i$ comes into action and causes the current supply circuit to be opened. If the current required is normal, the motor continues to rotate at a relatively slow speed, but gradually, as the working parts of the engine become easier, the current necessary to drive the motor decreases in value, and eventually (under ordinary conditions) reaches a predetermined minimum value. The minimum current relay $j$ then comes into action and closes a circuit containing, for example, a white lamp $w$ or other indicating device which announces to the attendant that the first stage of the running-in process has been completed. The attendant then operates a press button whereby the resistance $d$ and the series field winding $b$ are put out of action, causing the motor to be driven at a predetermined higher speed. The current required by the motor thereupon increases, the white lamp $w$ or other indicator ceases to function, and the engine enters upon the next (and usually final) stage of the running-in process. As before the current falls as the engine becomes easier, until eventually it again reaches the lower limit and the lamp or other indicator is again brought into action to announce the completion of running-in.

The attendant now causes the switch $l$ to be opened and the switch $o$ to be closed. The resistance $d$ is adjusted, and the engine operating under its own power is caused to drive the machine $a$ as a generator. At this stage the current generated is discharged around the circuit $n$, the resistance in that circuit providing a dummy load. The attendant now adjusts the engine, as regards timing of ignition and regulation of the carburettor, and other details, if necessary, and after such adjustments and any necessary preliminary trials on the engine, he opens the switch $o$ and closes the switch $l$. The current generated is now given up to the supply system. The reversal of current through the differential relay causes the circuit containing the red lamp $s$ or other indicator to be opened and a circuit containing a green lamp $v$ or other indicator to be closed. The watt-meter indicates the power generated, and when the power reaches a predetermined maximum, the maximum power relay $m$ comes into action and by closing a circuit causes another lamp $t$ or indicator to come into action.

If desired the power generated may be returned to the supply mains, or to the motor generator, if power is taken from an alternating source of supply. Preferably a number of systems as above described are arranged in parallel (with or without a battery or accumulator) and are so connected that power generated in one or more may contribute to the power required to be expended for running-in purposes in the others. The lamps indicated in the drawing may be fed from any suitable source of current (not shown). Actually they are fed from any ordinary electric supply circuit.

By means of our invention we are able to effect the running-in or conditioning and subsequent testing of large numbers of engines in an expeditious and economical manner, and no special skill is required by the attendant to operate the apparatus effectively.

Having thus described our invention what we claim as new and desire to secure by Letters Patent is:—

1. An apparatus for conditioning and testing engines comprising a dynamo-electric machine adapted to be operatively coupled to an engine, an electrical circuit comprising said dynamo-electric machine, a variable resistance, an overload relay and a minimum load relay, means for indicating the electrical energy flowing in said circuit, main load lines connected to said circuit, and means for introducing a short circuiting resistance across said main load lines.

2. An apparatus for conditioning and testing engines comprising a dynamo-electric machine adapted to be operatively coupled to an engine, an electric circuit comprising said machine, a variable resistance, an overload relay, a minimum load relay, a differential relay and a maximum power relay, means for indicating the electrical energy flowing in said circuit, signalling means responsive to the differential relay, the minimum load relay and the maximum power relay, and main load lines connected to said circuit.

In testimony whereof we have signed our names to this specification.

FRANK W. HIGHFIELD.
HERBERT EDGAR TAYLOR.